United States Patent [19]

Yanagihara et al.

[11] 4,116,234
[45] Sep. 26, 1978

[54] INTERNAL COMBUSTION ENGINE WITH AN AUXILIARY COMBUSTION CHAMBER

[75] Inventors: Hiromichi Yanagihara; Nobuhiro Miura, both of Susono, Japan

[73] Assignee: Toyota Jidosha Kogyo Kabushiki Kaisha, Toyota, Japan

[21] Appl. No.: 804,165

[22] Filed: Jun. 6, 1977

[30] Foreign Application Priority Data

Apr. 5, 1977 [JP] Japan ................................. 52-38105

[51] Int. Cl.² ...................... F02B 19/10; F02B 19/16
[52] U.S. Cl. .............................. 123/32 SP; 123/32 C
[58] Field of Search ............. 123/32 SP, 32 C, 191 S, 123/191 SP

[56] References Cited

U.S. PATENT DOCUMENTS 4,038,959   8/1977   Takizawa ......................... 123/32 SP

*Primary Examiner*—Ronald B. Cox
*Attorney, Agent, or Firm*—Stevens, Davis, Miller & Mosher

[57] ABSTRACT

Disclosed is an internal combustion engine comprising a main chamber and an auxiliary chamber which are interconnected with each other via a connecting passage. An annular raised portion is formed on the inner wall of the auxiliary chamber, and the auxiliary chamber is divided into a first auxiliary chamber and a second auxiliary chamber by the annular raised portion. The connecting passage is tangentially connected to the inner wall of the second auxiliary chamber. The nozzle of a fuel injector is disposed in the auxiliary chamber and is directed to the recess which is formed in the second auxiliary chamber beneath the annular raised portion at a position located opposite to the inner wall to which the connecting passage is tangentially connected with respect to the axis of the auxiliary chamber. The spark gap of a spark plug is located in the recess of the second auxiliary chamber. The connecting passage has an approximately elliptical cross-section which has a major axis and a minor axis. A ratio of the length of said minor axis to the length of the major axis is in the range of 0.4 through 0.6. An angle between the axis of the connecting passage and a plane defined by the flat top surface of the piston is in the range of 25 through 45°. An angle between the axis of the connecting passage and the axis of the auxiliary chamber is in the range of 30 through 50°. A ratio of the cross-sectional area of the connecting passage to the volume of the auxiliary chamber is in the range of 0.05 through 0.1 cm⁻¹. The sum of the volumes of the auxiliary chamber and the connecting passage is more than 80 percent of the sum of the volumes of the auxiliary chamber, the connecting passage and the main chamber when said piston reaches the top dead center.

2 Claims, 3 Drawing Figures

INTERNAL COMBUSTION ENGINE WITH AN AUXILIARY COMBUSTION CHAMBER

DESCRIPTION OF THE INVENTION

The present invention relates to an internal combustion engine provided with a large size auxiliary chamber.

There has been proposed an internal combustion engine comprising a main chamber and an auxiliary chamber which are interconnected with each other via a connecting passage. In this engine, the auxiliary chamber has a volume of approximately 80 percent relative to the total volume of the combustion chamber and is divided into a first auxiliary chamber and a second auxiliary chamber by an annular raised portion defining a circular restricted opening. The connecting passage is tangentially connected to the inner wall of the second auxiliary chamber located at a position near the main chamber. A recess is formed on the inner wall of the second auxiliary chamber beneath the annular raised portion at a position located opposite to the inner wall to which the connecting passage is tangentially connected with respect to the axis of the auxiliary chamber. The spark gap of a spark plug is located in the vicinity of the recess. The fuel injector is disposed in the auxiliary chamber so as to form a rich air-fuel mixture in the recess. In operation, at the time of the intake stroke, a suction gas such as air or a lean air-fuel mixture, or a suction gas containing a recirculated exhaust gas therein is introduced into the main chamber. Then, at the time of the compression stroke, the suction gas is forced into the auxiliary chamber via the connecting passage. As mentioned above, since the connecting passage is tangentially connected to the inner wall of the second auxiliary chamber, the suction gas causes a swirl motion in the auxiliary chamber. Then, fuel is injected from the fuel injector towards the swirling suction gas and, as a result, the combustible mixture thus formed is ignited by the spark plug. After this, the burned gas is injected into the main chamber via the connecting passage.

In an internal combustion engine of this type, in order to improve ignition and obtain a good combustion in the auxiliary chamber, it is necessary to create an appropriate and a strong swirl motion in the auxiliary chamber. In an engine of the above-mentioned type, the angle between the axis of the connecting passage and the axis of the auxiliary chamber, the cross-sectional area of the connecting passage and the cross-sectional shape of the connecting passage have great influences on the flow direction and the strength of the swirl motion created in the auxiliary chamber. Consequently, in order to create an appropriate and a strong swirl motion in the auxiliary chamber, it is necessary to appropriately set the angle between the axis of the connecting passage and the axis of the auxiliary chamber, the cross-sectional area of the connecting passage and the cross-sectional shape of the connecting passage. As a method of obtaining a strong swirl motion, there is known a method of reducing the cross-sectional area of the connecting passage. However, in this method, since the energy loss of the burning jet caused by throttling is increased, the output power of the engine is reduced. In addition, there occurs problems in that a loud noize is generated when the burned gas is injected into the main chamber and that the flame injected from the auxiliary chamber is extinguished. Consequently, taking the above problems into consideration, it is necessary to determine the cross-sectional area of the connecting passage. In addition, when the angle between the axis of the connecting passage and the plane defined by the flat top surface of the piston is set so as to be an angle close to a right angle, since the flame injected from the auxiliary chamber always impinges upon a particular portion of the top surface of the piston, there is a danger that the piston will melt. In addition, in this case, since the flame injected from the connecting passage does not reach over the entire space of the auxiliary chamber, the lubricating oil used for lubricating the piston and adhering onto the inner wall of the main chamber cannot be burned. This results in a problem in that a large amount of unburned HC components is produced. Contrary to this, from the point of view of the construction of the engine, it is difficult to extremely reduce the angle between the axis of the connecting passage and the plane defined by the flat top surface of the piston. Consequently, taking the above problems and difficulty into consideration, it is necessary to determine the angle between the axis of the connecting passage and the plane defined by the flat top surface of the piston.

An object of the present invention is to provide an optimum arrangement and an optimum shape of the auxiliary chamber and the connecting passage, which are capable of solving the above-mentioned various problems.

According to the present invention, there is provided an internal combustion engine comprising: a cylinder block having a cylinder bore therein; a cylinder head having a cavity therein and mounted on said cylinder block, said cavity having an inner wall which defines an auxiliary chamber with an axis; a piston reciprocally movable in said cylinder bore; said piston and said cylinder head forming a main chamber therebetween; an intake valve movably mounted on said cylinder head for leading gas into said main chamber; an exhaust valve movably mounted on said cylinder head for discharging exhaust gas into the atmosphere; an annular raised portion formed on the inner wall of said auxiliary chamber and defining a restricted opening of approximately circular shape, said annular raised portion dividing said auxiliary chamber into a first chamber of approximately spherical shape and a second chamber of an ellipsoid shape which are arranged in tandem along the axis of said auxiliary chamber and forming a recess in said second chamber beneath said annular raised portion; a connecting passage formed in said cylinder head and communicating said main chamber with said auxiliary chamber, said connecting passage being arranged to be tangentially connected to the inner wall of said second chamber for creating a swirl motion of the gas at the time of the compression stroke; a fuel injector having an injecting nozzle disposed in said auxiliary chamber and directed to said recess located opposite to the inner wall to which said connecting passage is tangentially connected with respect to the axis of said auxiliary chamber for forming a rich air-fuel mixture in said recess, and; a spark plug having a spark gap located in said recess for igniting the rich air-fuel mixture formed therein, wherein said connecting passage has an approximately elliptical cross-section which has a major axis and a minor axis, a ratio of the length of said minor axis to the length of the major axis being in the range of 0.4 through 0.6, an angle between the axis of said connecting passage and a plane defined by the flat top surface of said piston being in the range of 25° through 45°, an angle between an axis of said connecting passage and the axis of said auxiliary chamber being in the range of 30° through 50°, a ratio of the cross-sectional area of the connecting passage to the volume of the auxiliary chamber being in the range of 0.05 through 0.1 cm$^{-1}$, the sum of the volumes of said auxiliary chamber and the connecting passage being more than 80 percent of the sum of the volumes of the auxiliary chamber, the connecting passage and said main chamber when said piston reaches the top dead center.

The present invention may be more fully understood from the description of a preferred embodiment of the invention set forth below, together with the accompanying drawings.

DESCRIPTION OF A PREFERRED EMBODIMENT

Figure 1:
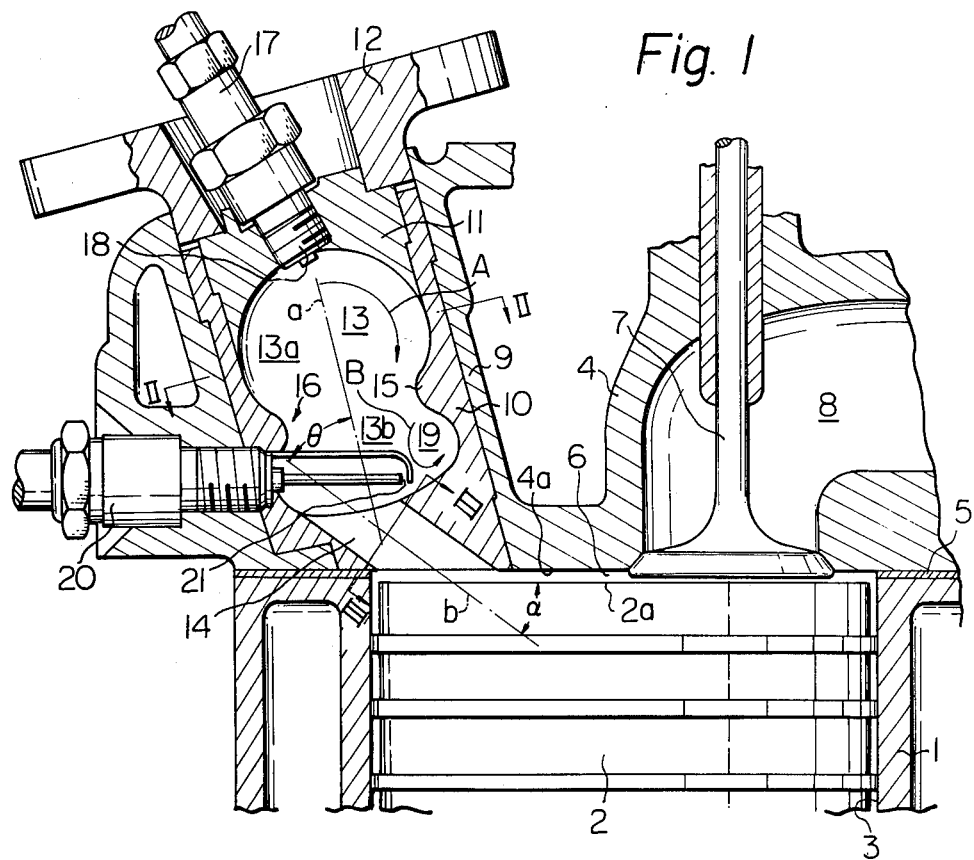
FIG. 1 is a cross-sectional side view of an internal combustion engine according to the present invention.
Figure 2:
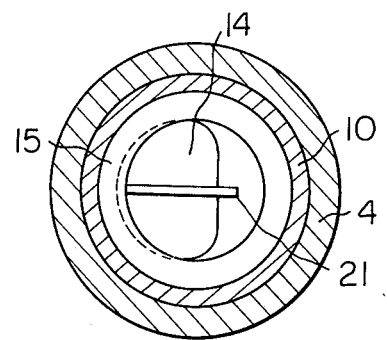
FIG. 2 is a cross-sectional view taken along the line II—II in FIG. 1.

Referring to FIG. 1, 1 designates a cylinder block, 2 a piston reciprocally movable in a cylinder bore 3 and having a flat top surface 2a, 4 a cylinder head fixed onto the cylinder block 1 via a gasket 5 and having a flat inner wall 4a, 6 a main chamber, 7 an intake valve, and 8 an intake port. In addition, an exhaust valve (not shown) is movable mounted on the cylinder head 4. A hole 9 having a circular cross-section is formed in the cylinder head 4, and an auxiliary chamber component 10 is fitted into the hole 9. In addition, another auxiliary chamber component 11 is fitted into the upper portion of the auxiliary chamber component 10. The auxiliary chamber components 10 and 11 are rigidly fixed onto the cylinder head 4 by a fixing plate 12 fixed onto the cylinder head 4 by means of bolts (not shown). An auxiliary chamber 13 is formed in the auxiliary chamber components 10 and 11 and is connected to the main chamber 6 via a connecting passage 14 formed in the auxiliary chamber component 10. In addition, the sum of the volumes of the auxiliary chamber 13 and the connecting passage 14 is set so as to be more than 80 percent of the sum of the volumes of the auxiliary chamber 13, the connecting passage 14 and the main chamber 6 at the time when the piston 2 is positioned at the top dead center as shown in FIG. 1.

The shape of the inner wall of the auxiliary chamber 13 is formed in a symmetrical surface around the axis $a$ of the auxiliary chamber 13. An annular raised portion 15 presenting a smoothly curved line in a longitudinal cross-section as shown in FIG. 1 is formed on the inner wall of the auxiliary chamber 13 and defines a circular or an elliptical restricted opening 16. The auxiliary chamber 13 is divided into a first auxiliary chamber 13a and a second auxiliary chamber 13b by an annular raised portion 15, and this annular raised portion 15 is arranged so that the volume of the second auxiliary chamber 13b is less than 40 percent relative to the volume of the first auxiliary chamber 13a. The shape of the inner wall of the first auxiliary chamber 13a is spherical or approximately ellipsoid. On the other hand, the shape of the inner wall of the second auxiliary chamber 13b is an ellipsoid. The upper end of the connecting passage 14 is tangentially connected to the inner wall of the second auxiliary chamber 13b, while the lower end of the connecting passage 14 opens into the periphery of the main chamber 6. A nozzle 18 of a fuel injector 17 is disposed at the apex of the first auxiliary chamber 13a and is arranged to be directed to a recess 19 which is formed on the inner wall of the secondary auxiliary chamber 13b beneath the annular raised portion 15 at a position located opposite to the inner wall to which the connecting passage 14 is tangentially connected with respect to the axis $a$ of the auxiliary chamber 13. In addition, a spark gap 21 of a spark plug 20 is located in the recess 19 in the vicinity of the opening of the connecting passage 14. Since the engine shown in FIG. 1 is provided with no throttle valve in the intake port 8, the intake port 8 is directly connected to an air clearner (not shown) or is connected to the air cleaner via a carburetor (not shown) forming a lean air-fuel mixture and having no throttle valve. Therefore, in these engines, the regulation of the load of the engine is carried out by regulating an amount of fuel injected from the fuel injector 17. In addition, the exhaust gas may be recirculated into the intake port 8.

In operation, at the time of the intake stroke, a suction gas such as air or a lean air-fuel mixture, or a suction gas containing a recirculated exhaust gas therein is introduced into the main chamber 6 via the intake valve 7. Then, at the time of the compression stroke, the suction gas introduced into the main chamber 6 is forced into the auxiliary chamber 13 via the connecting passage 14. The suction gas introduced into the auxiliary chamber 13 passes through the second auxiliary chamber 13b and enters into the first auxiliary chamber 13a, thus causing a strong swirl motion, as shown by the arrow A, in the first auxiliary chamber 13a. On the other hand, a swirl motion, as shown by the arrow B, is caused in the recess 19 by the strong swirl motion A. The fuel injecting operation of the fuel injection 17 is started when the piston reaches approximately bottom dead center at the beginning of the compression stroke, and said fuel injecting operation is completed when the piston reaches a point corresponding to approximately 120° before top dead center. A large part of the fuel injected from the fuel injector 17 towards the recess 19 remains in the recess 19, and the remaining small part of the fuel enters into the first auxiliary chamber 13a via the second auxiliary chamber 13b. After this, a part of the fuel introduced into the first auxiliary chamber 13a is again returned to the second auxiliary chamber 13b. As stated previously, a swirl motion B is created in the recess 19. Consequently, the vaporization of the liquid fuel adhering onto the inner wall of the recess 19 is promoted by the swirl motion B and by the heat of the inner wall of the recess 19, and as a result, a rich air-fuel mixture is formed in the recess 19. Then, the rich air-fuel mixture formed in the recess 19 is ignited by the spark plug 20. A small part of the flame of the rich air-fuel mixture thus ignited is injected into the main chamber 6 via the connecting passage 14, while the remaining large part of the flame propagates into the first auxiliary chamber 13a via the restricted opening 16. While an extremely lean air-fuel mixture is formed in the first auxiliary chamber 13a, the flame propagating into the first auxiliary chamber 13a swirls in the first auxiliary chamber 13a together with the strong swirl motion A created in the first auxiliary chamber 13a and, as a result, the lean air-fuel mixture in the first auxiliary chamber 13a is rapidly and almost completely burned.

As stated previously, in the engine shown in FIG. 1, an extremely lean air-fuel mixture is formed in the first auxiliary chamber 13a. In order to completely and rapidly burn this extremely lean air-fuel mixture, it is necessary to create a strong swirl motion in the first auxiliary chamber 13a. On the other hand, while it is necessary to form a rich air-fuel mixture in the recess 19, if an extremely strong swirl motion is created in the recess 19, a rich air-fuel mixture formed in the recess 19 is diffused into the auxiliary chamber 13 by the strong swirl motion created in the recess 19 and, as a result, it is impossible to ignite the combustible mixture in the recess 19. Therefore, it is necessary to create a swirl motion of an appropriate strength in the recess 19.

In the case wherein the angle between the axis $a$ of the auxiliary chamber 13 and the axis $b$ of the connecting passage 14 is indicated by $\theta$, if the angle $\theta$ is extremely small, the suction gas forced into the auxiliary chamber 13 via the connecting passage 14 at the time of the compression stroke directly impinges upon the inner wall of the auxiliary chamber 13 located at a position near the apex of the first auxiliary chamber 13a. Therefore, in this case, a swirl motion cannot be created in the first auxiliary chamber 13a. Contrary to this, if the angle $\theta$ is relatively large, the stream of the suction gas forced into the auxiliary chamber 13 via the connecting passage 14 is obstructed by the annular raised portion 15. In addition, since the suction gas impinging upon the annular raised portion 15 disturbs the mixture in the second auxiliary chamber 13b, there occurs a problem in that a rich air-fuel mixture formed in the recess 19 is diffused into the auxiliary chamber 13. According to the experiments conducted by the inventor, it has been proven that, in order to create a strong swirl motion in the first auxiliary chamber 13a and to create an appropriate swirl motion in the recess 19, it is necessary to set the angle $\theta$ in the range of 30° through 50°.

In addition, as a method of creating a strong swirl motion in the first auxiliary chamber 13a, there is known a method of reducing the cross-sectional area of the connecting passage 14. However, in this method, as stated previously, since the energy loss of the burning jet caused by throttling is increased, the output power of the engine is reduced. In addition, in this method, there occurs problems in that a loud noize is generated when the burned gas is injected into the main chamber, and that the flame injected from the auxiliary chamber is extinguished. According to the experiments conducted by the inventor, it has been proven that, in order to minimize the energy loss of the burning jet caused by throttling, the prevent the loud noize being generated, to prevent the flame injected from the connecting passage being extinguished and to create a strong swirl motion in the first auxiliary chamber 13a, it is necessary to set the ratio of the cross-sectional area of the connecting passage 14 to the volume of the auxiliary chamber 13 in the range of 0.05 through 0.1 cm$^{-1}$.

In addition, in the case wherein the angle between the axis $b$ of the connecting passage 14 and the plane defined by the flat top surface of the piston 2 is indicated by $\alpha$, if the angle $\alpha$ is equal to approximately a right angle, as stated previously, since the flame injected from the auxiliary chamber always impinges upon a particular portion of the top surface of the piston, there is a danger that the piston will melt. In addition, in this case, since the flame injected from the connecting passage does not reach over the entire space of the auxiliary chamber, the lubricating oil used for lubricating the piston and adhering onto the inner wall of the main chamber cannot be burned. This results in a problem in that a large amount of unburned HC components is produced. Contrary to this, as stated previously, it is difficult to extremely reduce the angle $\alpha$ in view of the construction of the engine. According to the experiments conducted by the inventor, it has been proven that, in order to prevent melting of the piston and to spread the flame injected from the connecting passage over the entire space of the main chamber, it is necessary to set the angle $\alpha$ in the range of 25° through 40°.

Figure 3:
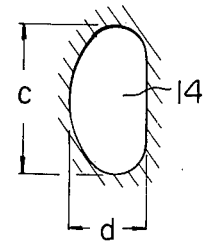
FIG. 3 is a cross-sectional view taken along the line III—III in FIG. 1.

In addition, as is shown in FIG. 3, it is preferable that the connecting passage 14 have an approximately elliptical cross-section so that a swirl motion is created over the entire space of the first auxiliary chamber 13a. However, if the length $c$ of the major axis of the approximately elliptical cross-section is extremely elongated, and the length $d$ of the minor axis thereof is shortened, there occurs problems in that the flame injected from the auxiliary chamber is extinguished, and the energy loss of the burning jet caused by throttling is increased. According to the experiments conducted by the inventor, it has been proven that, in order to prevent the flame injected from the auxiliary chamber being extinguished and to create a swirl motion over the entire space of the first auxiliary chamber 13a, it is necessary to set the ratio of the length $d$ of the minor axis to the length $c$ of the major axis in the range of 0.4 through 0.6.

According to the present invention, there is provided an internal combustion engine capable of obtaining a stable ignition, of obtaining a stable combustion and of reducing the amount of harmful components in the exhaust gas.

While the invention has been described by reference to specific embodiments chosen for purposes of illustration, it should be apparent that numerous modifications could be made thereto by those skilled in the art without departing from the spirit and scope of the invention.

What is claimed is:

1. An internal combustion engine comprising:
   a cylinder block having a cylinder bore therein;
   a cylinder head having a cavity therein and mounted on said cylinder block, said cavity having an inner wall which defines an auxiliary chamber with an axis;
   a piston reciprocally movable in said cylinder bore, said piston and said cylinder head forming a main chamber therebetween;
   an intake valve movably mounted on said cylinder head for leading gas into said main chamber;
   an exhaust valve movably mounted on said cylinder head for discharging exhaust gas into the atmosphere;
   an annular raised portion formed on the inner wall of said auxiliary chamber and definning a restricted opening of approximately circular shape, said annular raised portion dividing said auxiliary chamber into a first chamber of approximately spherical shape and a second chamber of an ellipsoid shape, which are arranged in tandem along the axis of said auxiliary chamber and forming a recess in said second chamber beneath said annular raised portion;
   a connecting passage formed in said cylinder head and communicating said main chamber with said auxiliary chamber, said connecting passage being arranged to be tangentially connected to the inner wall of said second chamber for creating a swirl motion of the gas at the time of the compression stroke;

a fuel injector having an injecting nozzle disposed in said auxiliary chamber and directed to said recess located opposite to the inner wall to which said connecting passage is tangentially connected with respect to the axis of said auxiliary chamber for forming a rich air-fuel mixture in said recess, and;

a spark plug having a spark gap located in said recess for igniting the rich air-fuel mixture formed therein, wherein said connecting passage has an approximately elliptical cross-section which has a major axis and a minor axis, a ratio of the length of said minor axis to the length of the major axis being in the range of 0.4 through 0.6, an angle between the axis of said connecting passage and a plane defined by the flat top surface of said piston being in the range of 25° through 45°, an angle between an axis of said connecting passage and the axis of said auxiliary chamber being in the range of 30° through 50°, a ratio of the cross-sectional area of the connecting passage to the volume of the auxiliary chamber being in the range of 0.05 through 0.1 $cm^{-1}$, the sum of the volumes of said auxiliary chamber and the connecting passage being more than 80 percent of the sum of the volumes of the auxiliary chamber, the connecting passage and said main chamber when said piston reaches the top dead center.

2. An internal combustion engine as claimed in claim 1, wherein the spark gap of said spark plug is located in the vicinity of an opening of said connecting passage.

* * * * *